(12) United States Patent
Kuo

(10) Patent No.: US 9,381,455 B2
(45) Date of Patent: Jul. 5, 2016

(54) FLUID FILTRATION DEVICE

(71) Applicant: New Century Membrane Technology Co., Ltd., Taichung (TW)

(72) Inventor: Chi-Chang Kuo, Taichung (TW)

(73) Assignee: NEW CENTURY MEMBRANE TECHNOLOGY CO., LTD., Taichung (TW)

( * ) Notice: Subject to any disclaimer, the term of this patent is extended or adjusted under 35 U.S.C. 154(b) by 260 days.

(21) Appl. No.: 14/180,259

(22) Filed: Feb. 13, 2014

(65) Prior Publication Data

US 2015/0224430 A1    Aug. 13, 2015

(51) Int. Cl.
*B01D 33/21* (2006.01)
*B01D 33/46* (2006.01)
*B01D 33/80* (2006.01)

(52) U.S. Cl.
CPC .............. *B01D 33/21* (2013.01); *B01D 33/461* (2013.01); *B01D 33/801* (2013.01)

(58) Field of Classification Search
None
See application file for complete search history.

(56) References Cited

U.S. PATENT DOCUMENTS

| | | | | |
|---|---|---|---|---|
| 3,395,824 A * | 8/1968 | Gerhard | ............... | B65D 90/025 220/4.12 |
| 7,975,854 B2 * | 7/2011 | Dendel | ................. | B01D 33/15 100/223 |
| 2007/0164034 A1 * | 7/2007 | Lee | ...................... | B65D 90/022 220/565 |
| 2012/0080370 A1 * | 4/2012 | Kuo | ...................... | B01D 33/21 210/327 |

\* cited by examiner

*Primary Examiner* — Benjamin Kurtz

(57) ABSTRACT

A fluid filtration device contains a processing tank, a driving unit disposed outside the processing tank, a water pipe and a filtering unit. The processing tank is formed by plural substrate units arranged around the processing tank, each substrate unit has plural plate members connected together and formed on equal proportion, each plate member has an external surface and at least one circularly recessed portion, and on two connecting edges of any two adjacent plate members is defined a connector. The water pipe is connected with the driving unit and includes a peripheral wall, a plurality of apertures, and plural retaining protrusions. The filtering unit includes a plurality of filtration bags and plural guiding disks, each filtration bag has a first central pore, and each guiding disk has a body, a second central pore, and a plurality of coupling recesses.

6 Claims, 7 Drawing Sheets

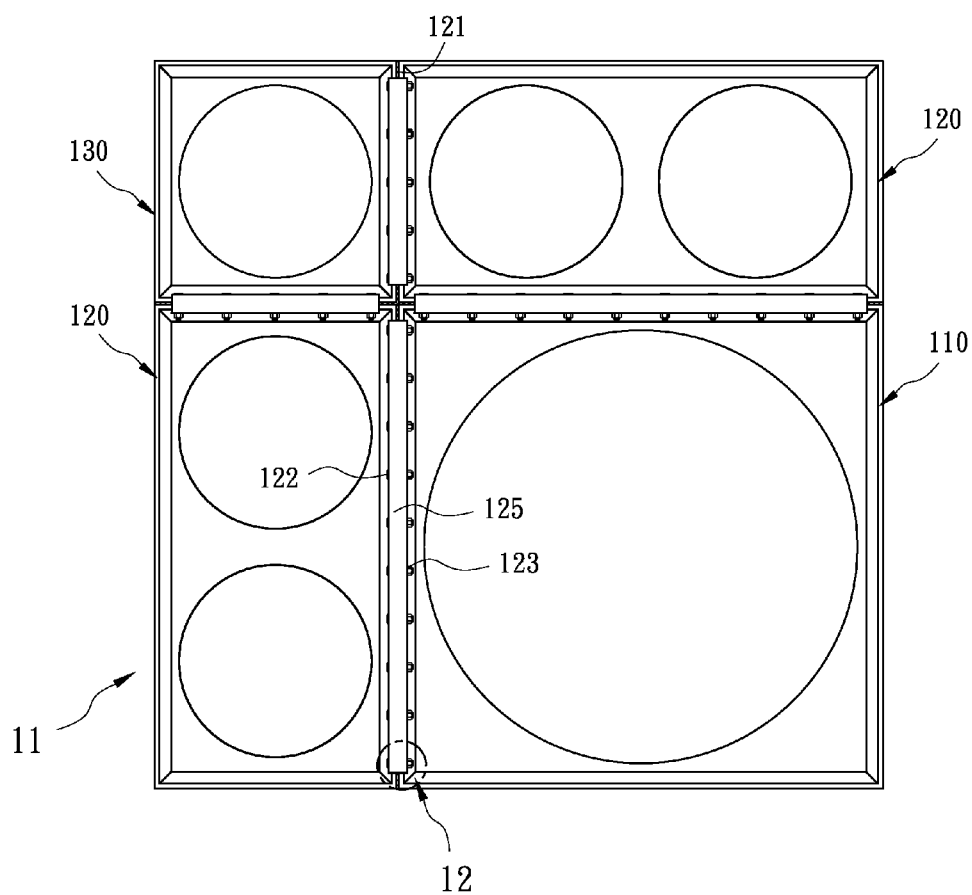
FIG. 8
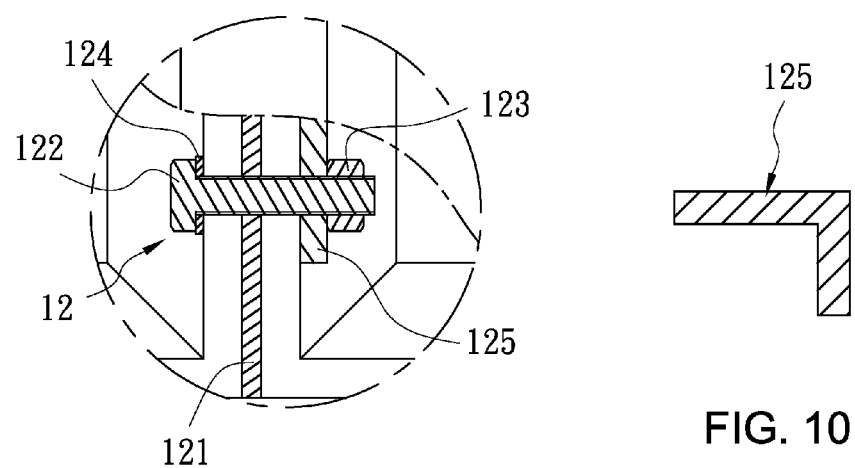
FIG. 9
FIG. 10

FLUID FILTRATION DEVICE

FIELD OF THE INVENTION

The present invention relates to a fluid filtration device in which a processing tank can be expendable based on using requirement by ways of plural plate members and can accommodate a plurality of filtration bags.

BACKGROUND OF THE INVENTION

A conventional fluid processing device with a scraping mechanism is disclosed in TW Filing No. 099116162 and contains a processing tank, a driving unit, a water pipe, a filtering unit, and a scraping unit. The water pipe is connected with a driving shaft of the driving unit. The filtering unit has a plurality of circular filtration bags retained thereon. The scraping unit has plural scrapers, and each scraper is retained between any two filtration bags. When the driving unit drives the water pipe to rotate, the filtering unit simultaneously rotates along an axis of the water pipe so that the plural scrapers scrap dirt on the filtration bags.

However, such a conventional filtration device still has some disadvantages as follows:

1. The processing tank has a fixed size and cannot be expandable, thus limiting use variability. In addition, when the processing tank has a large size, it is delivered troublesomely.

2. The water pipe is retained with the plurality of filtration bags by screwing a nut and a screw bolt together, so it cannot drive the plurality of filtration bags to rotate in case the screw bolt or the nut is loose or broken, and then the plural scrapers cannot scrap dirt on the plurality of filtration bags.

3. Since the plural scrapers directly contact with membrane surfaces of the plurality of filtration bags, anti-fouling material layers of the plurality of filtration bags are damaged by the plural scrapers easily.

The present invention has arisen to mitigate and/or obviate the afore-described disadvantages.

SUMMARY OF THE INVENTION

The primary object of the present invention is to provide a fluid filtration device in which a processing tank can be expendable based on using requirement by ways of a plural plate members.

Further object of the present invention is to provide a fluid filtration device in which each first plate, each second plate, and each third plate can be stacked together for convenient package and delivery; and at least one circularly recessed portion is applied to accommodate a plurality of filtration bags, thus saving package volume.

Another object of the present invention is to provide a fluid filtration device in which plural guiding disks are retained on a water pipe fixedly.

To obtain the above objective, a fluid filtration device provided by the present invention contains: a processing tank, a driving unit, a water pipe and a filtering unit.

The processing tank is a hollowly cuboid tank formed by a plurality of substrate units arranged around the processing tank, and each substrate unit has plural plate members connected together and formed on equal proportion, each plate member has an external surface projecting outwardly and at least one circularly recessed portion defined on an internal surface thereof, and on two connecting edges of any two adjacent plate members is defined a connector. The processing tank further includes an inlet, an outlet, and a draining orifice.

The driving unit is disposed outside the processing tank.

The water pipe is in connection with the driving unit and is inserted into an accommodating chamber of the processing tank via the outlet. The water pipe includes a peripheral wall arranged around an axis, a plurality of apertures passing through the peripheral wall, and plural retaining protrusions extending outwardly from the peripheral wall.

The filtering unit includes a plurality of filtration bags retained on the water pipe and plural guiding disks retained on the water pipe, any two of the plural guiding disks is retained on two sides of each filtration bag, and each filtration bag is perpendicular to the axis and has a first central pore communicating with the plurality of apertures. Each guiding disk has a body, a second central pore corresponding to the first central pore, and a plurality of coupling recesses arranged around a peripheral side of the second central pore and retained with the plural retaining protrusions of the water pipe, such that the plural guiding disks are connected with the water pipe, and the plurality of filtration bags and the plural guiding disks do not rotate relative to the water pipe, and when the driving unit drives the water pipe to rotate, the filtering unit synchronously rotates around the axis of the water pipe.

BRIEF DESCRIPTION OF THE DRAWINGS

FIG. 8 is a plan view showing the assembly of a substrate unit of the fluid filtration device with the disassemblable and assemblable tank according to the preferred embodiment of the present invention.

FIG. 9 is an amplified cross sectional view of a part of FIG. 8.

FIG. 10 is cross sectional view of an angle bar of the fluid filtration device with the disassemblable and assemblable tank according to the preferred embodiment of the present invention.

DETAILED DESCRIPTION OF THE PREFERRED EMBODIMENTS

Figure 1:
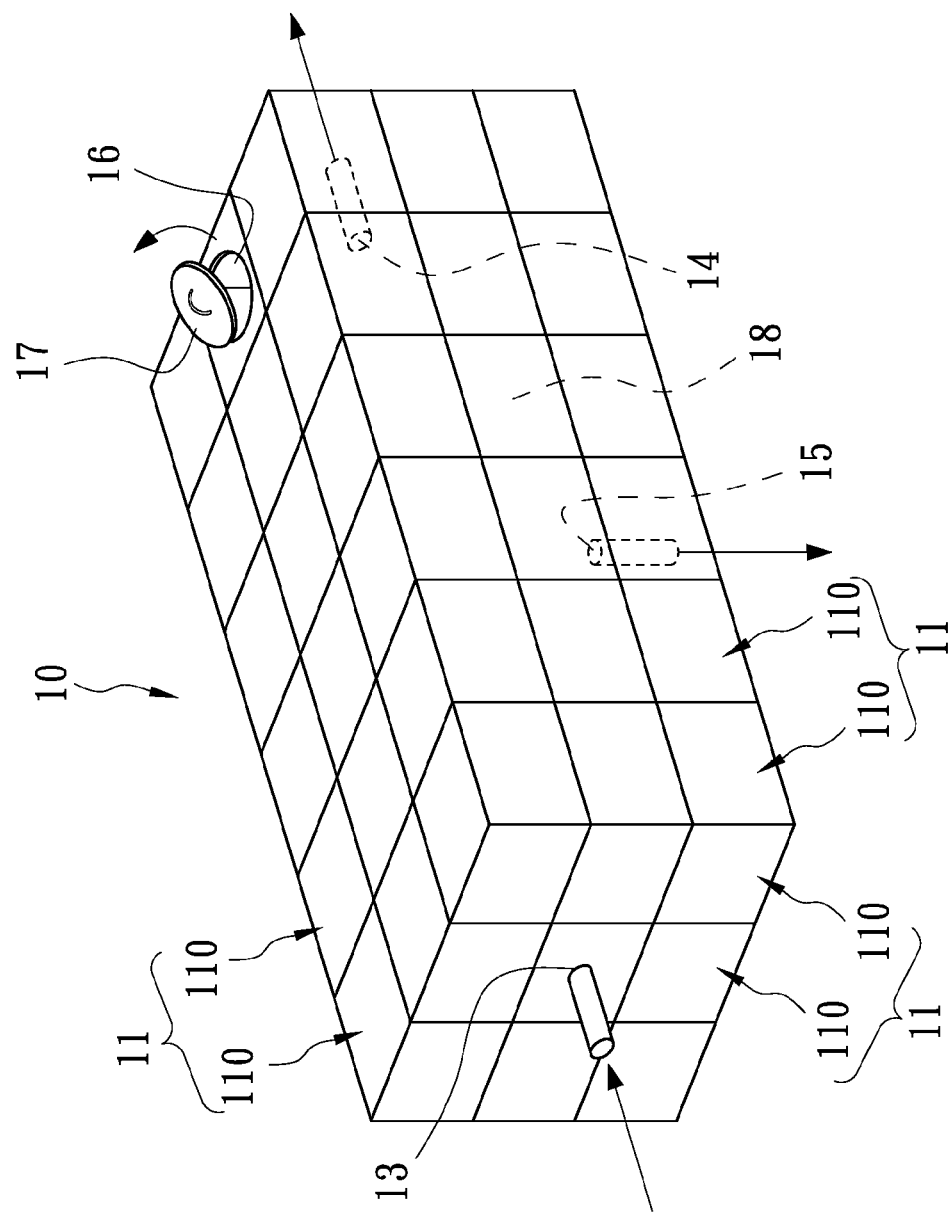
FIG. 1 is a perspective view showing the assembly of a fluid filtration device with a disassemblable and assemblable tank according to a preferred embodiment of the present invention.
Figure 2:
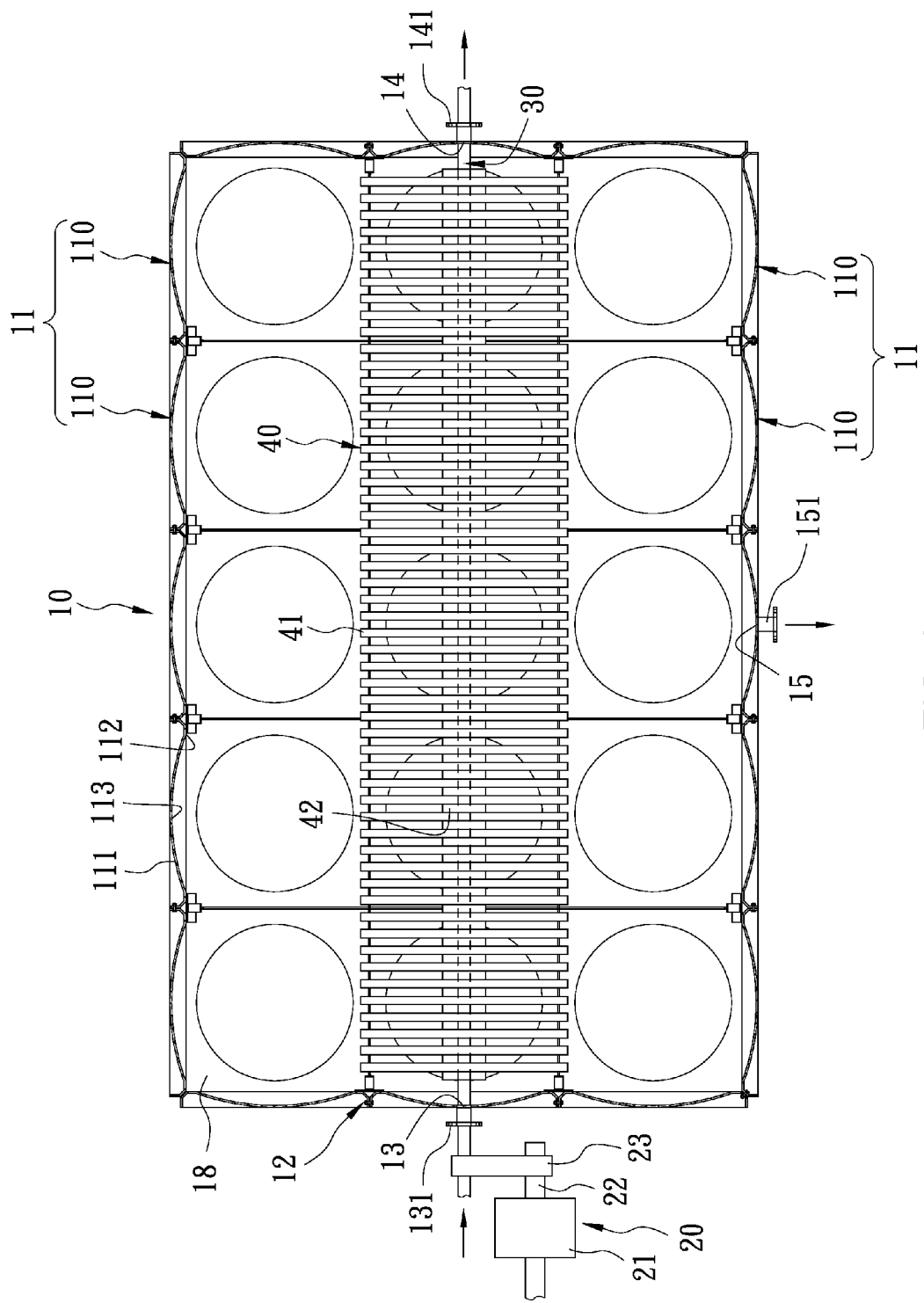
FIG. 2 is a cross sectional view showing the assembly of the fluid filtration device with the disassemblable and assemblable tank according to the preferred embodiment of the present invention.

With reference to FIGS. 1 and 2, a fluid filtration device with a disassemblable and assemblable tank according to a preferred embodiment of the present invention comprises: a processing tank 10, a driving unit 20, a water pipe 30 and a filtering unit 40.

Figure 3:
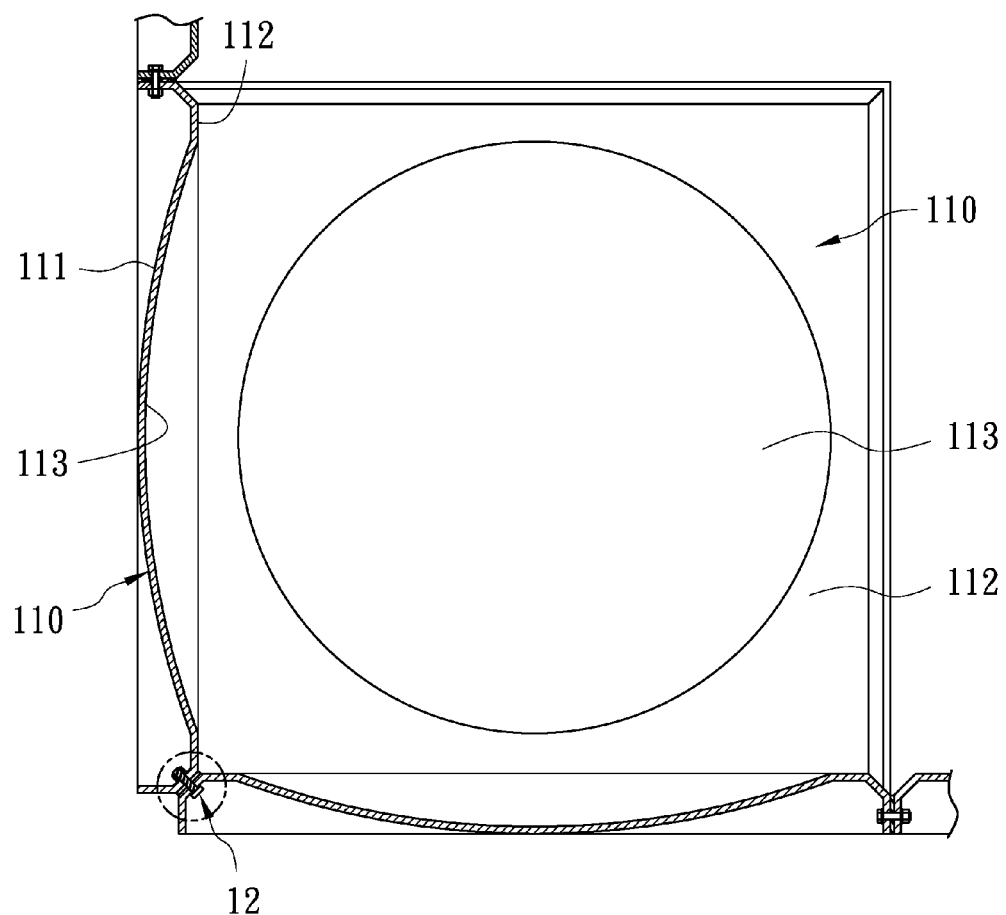
FIG. 3 is a cross sectional view showing the assembly of a part of each plate member of the fluid filtration device with the disassemblable and assemblable tank according to the preferred embodiment of the present invention.
Figure 4:
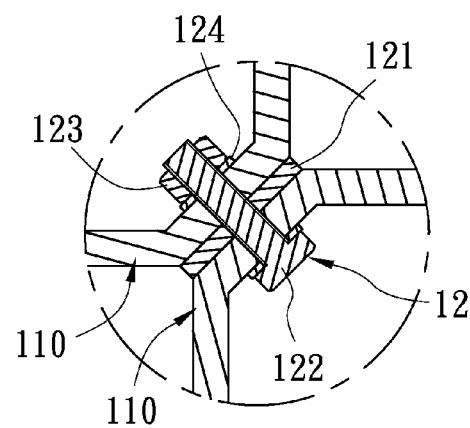
FIG. 4 is an amplified cross sectional view of a part of FIG. 3.

The processing tank 10 is a hollowly cuboid tank formed by a plurality of substrate units 11 arranged around the processing tank 20, and each substrate unit 11 has plural plate members 110 connected together and formed on equal proportion. As shown in FIGS. 3 and 4, each plate member 110 has an external surface 111 projecting outwardly so as to increase deformation resistance, each plate member 110 also has at least one circularly recessed portion 113 defined on an internal surface 112 thereof, and on two connecting edges of any two adjacent plate members 110 is defined a connector 12. The processing tank 10 further includes an inlet 13, an outlet 14, and a draining orifice 15.

In this embodiment, each plate member 110 of the processing unit 10 is hollow and made of plastic material so as to reduce weight. The connector 12 has a seal pad 121, a screw bolt 122, a nut 123 and at least one washer 124, such that when the two adjacent plate members 110 are connected together, the seal pad 121 is fixed between the two adjacent plate members 110, and then the screw bolt 122, the nut 124 and the at least one washer 124 are screwed together, thus stopping waste water.

As shown in FIG. 1, two first through holes are defined on two of the plural plate members 110 of the processing tank 10 so as to correspond to the water pipe 30 and the filtering unit 40, such that the two first through holes are used as the inlet 13 and the outlet 14. And, a second through hole is formed on one of the plural plate members 110 so as to be served as the draining orifice 15. In addition, a manhole 16 is arranged on another of the plural plate members 110 and is covered by a manhole cover 17, wherein the manhole 16 and the manhole cover 17 are arranged on another of the plural plate members 110 on a top end of the processing tank 10 so that an operator enters the processing tank 10 from the manhole 16. The inlet 13 has a first flange 131, the outlet 14 has a second flange 141 (as illustrated in FIG. 2), the first flange 131 of the inlet 13 and the second flange 141 of the outlet 14 are coupled with two ends of the water pipe 30, and the draining orifice 15 has a third flange 151 mounted thereon so as to drain waste water.

The driving unit 20 is disposed outside the processing tank 10 and includes a decelerator 21, a driving shaft 22 joined with the decelerator 21, and a bearing box 23 retained on the driving shaft 22 so as to bear a rotating load.

Figure 5:
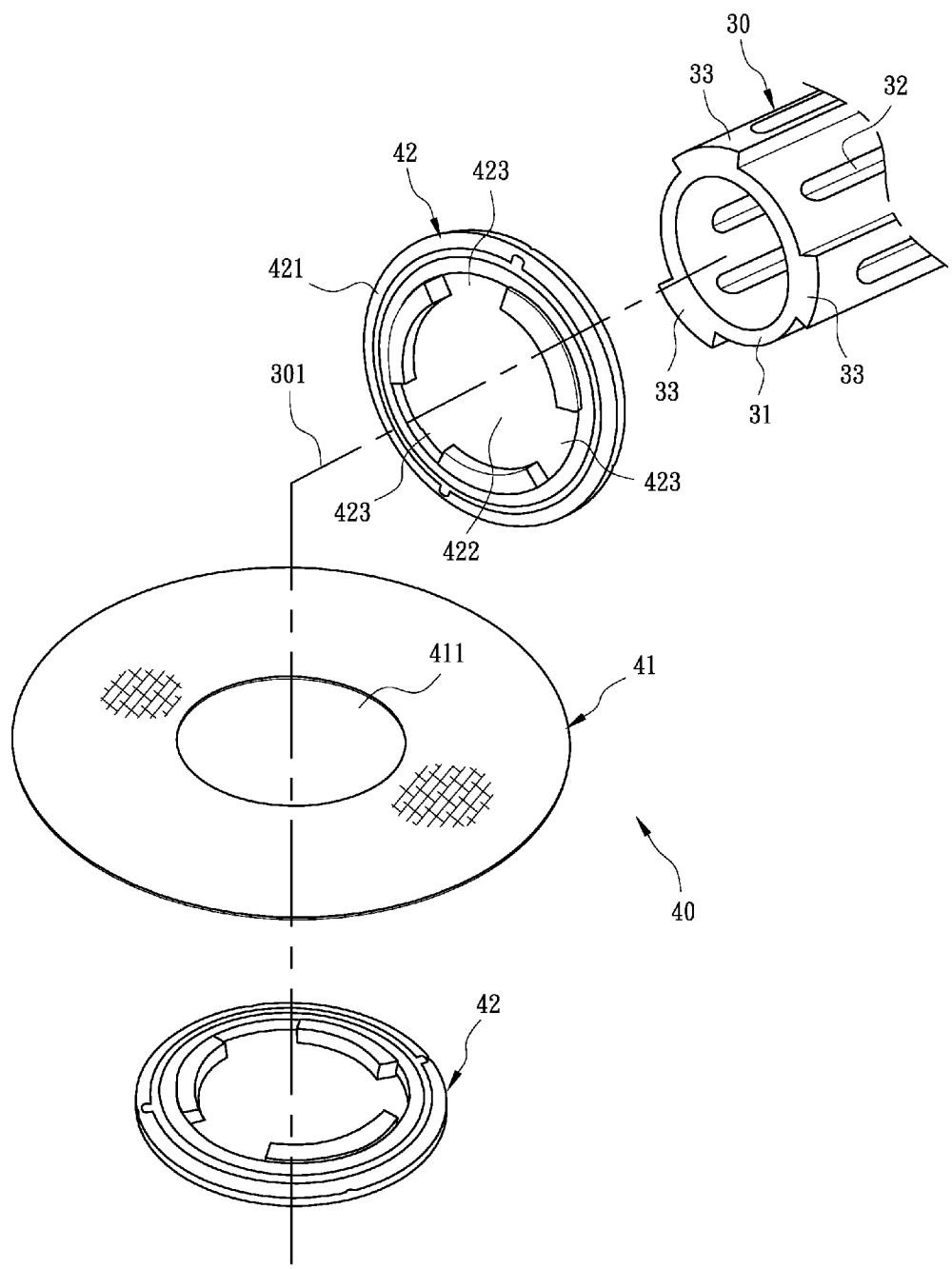
FIG. 5 is a perspective view showing the exploded components of a water pipe, a filtration bag and a guiding disk of the fluid filtration device with the disassemblable and assemblable tank according to the preferred embodiment of the present invention.
Figure 6:
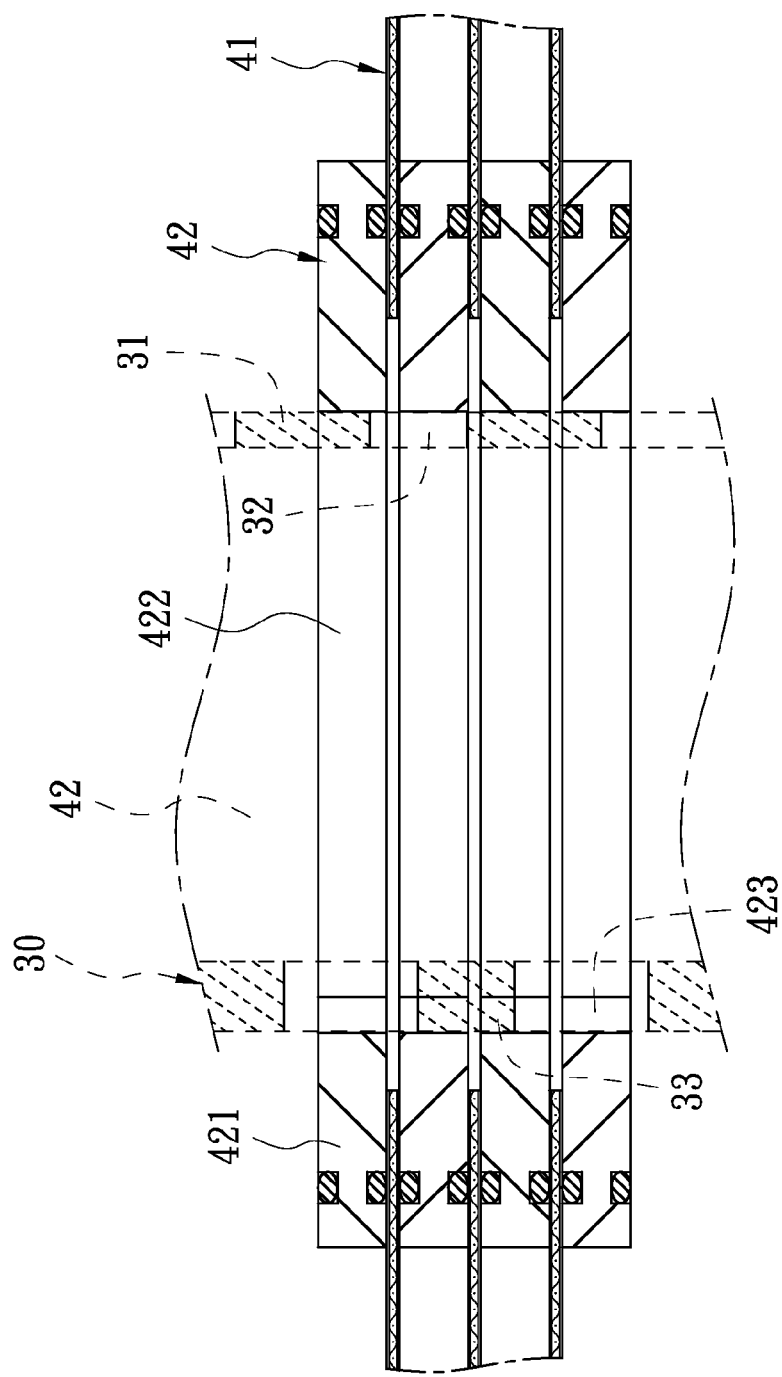
FIG. 6 is a cross sectional view showing the assembly of the water pipe, the filtration bag and the guiding disk of the fluid filtration device with the disassemblable and assemblable tank according to the preferred embodiment of the present invention.

The water pipe 30 is in connection with the driving unit 20 and is inserted into an accommodating chamber 18 of the processing tank 10 via the outlet 14. Referring to FIGS. 5 and 6, the water pipe 30 includes an peripheral wall 31 arranged around an axis 301, a plurality of apertures 32 passing through the peripheral wall 31, and plural retaining protrusions 33 extending outwardly from the peripheral wall 31. In this embodiment, each retaining protrusion 33 has a cross section in a dovetail shape.

The filtering unit 40 includes a plurality of filtration bags 41 retained on the water pipe 30 and plural guiding disks 42 retained on the water pipe 30, wherein any two of the plural guiding disks 42 are retained on two sides of each filtration bag 41. Each filtration bag 41 is perpendicular to the axis 301 and has a first central pore 411 communicating with the plurality of apertures 32. Each guiding disk 42 has a body 421, a second central pore 422 corresponding to the first central pore 411, and a plurality of coupling recesses 423 arranged around a peripheral side of the second central pore 422 and retained with the plural retaining protrusions 33 of the water pipe 30, such that the plural guiding disks 42 are connected with the water pipe 30, and the plurality of filtration bags 41 and the plural guiding disks 42 do not rotate relative to the water pipe 30, and when the driving unit 20 drives the water pipe 30 to rotate, the filtering unit 40 synchronously rotates around the axis 301 of the water pipe 30.

Figure 7:
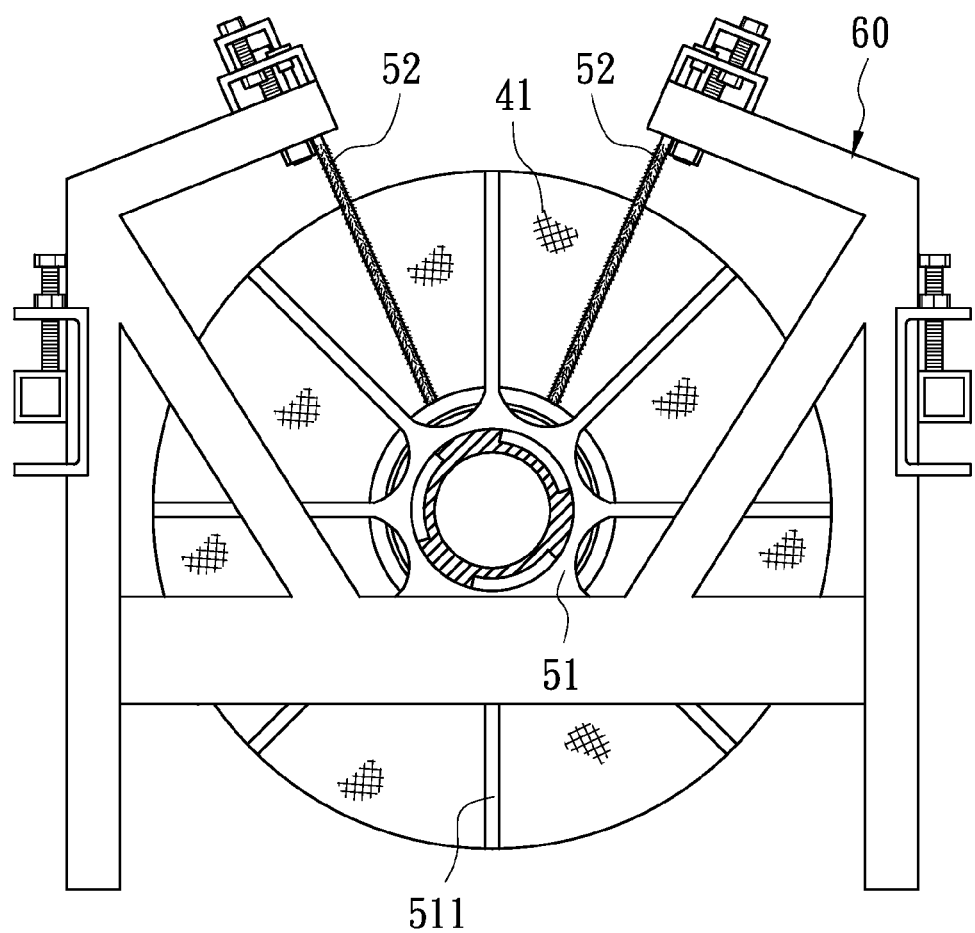
FIG. 7 is a plan view showing the operation of a scraping unit of the fluid filtration device with the disassemblable and assemblable tank according to the preferred embodiment of the present invention.

With reference to FIG. 7, the fluid filtration device of the present invention further comprises a scraping unit 50, and the scraping unit 50 includes a plurality of rotating discs 51 and plural brushers 52 corresponding to the plurality of filtration bags 41. Each brusher 52 is made of any one of rubber, sponge and staple material. When plural ribs 511 of each rotating disc 51 rotate with the water pipe 30 and contact with the plural brushers 52, they press the plural brushers 52 to move toward the plurality of filtration bags 41, such that the plural brushers 52 lightly contact with the plurality of filtration bags 41 so as to brush membrane surfaces of the plurality of filtration bags 41, and when the plural ribs 511 of each rotating disc 51 do not press the plural brushers 52, the plural brushers 52 recover an original state, hence the plural brushers 52 intermittently brush the plurality of filtration bags 41 so as to remove dirt from the membrane surfaces of the plurality of filtration bags 41. In this embodiment, the plural brushers 52 are secured on a support bracket 60. Referring to FIGS. 8-10, each plate member 110 of the substrate unit 11 is configured in three specifications, for example, a length and a width of each first plate 110 are equal; a length of each second plate 120 is half of a width of each second plate 120, and an area of each second plate 120 is less than half of that of each first plate 110; a length and a width of each third plate 130 are equal, and an area of each third plate 130 is half of that of each second plate 120. Thereby, each substrate unit 11 has the at least two plate members 110 connected together and formed on equal proportion (i.e., each first plate 110, each second plate 120, and each plate 130 are connected together and formed on equal proportion). The connector 12 further has an angle bar 125 for locking with the seal pad 121, the screw bolt 122, the nut 123, and the at least one washer 124 so as to connect each first plate 110, each second plate 120, and each plate 130 securely.

Accordingly, the fluid filtration device of the present invention has the following advantages:

1. The processing tank can be expendable based on using requirement by ways of the plural plate members (i.e., each first plate 110, each second plate 120, and each third plate 130) connected together and formed on equal proportion. Furthermore, each first plate 110, each second plate 120, and each third plate 130 can be stacked together for convenient package and delivery.

2. Since each first plate 110, each second plate 120, and each third plate 130 are stacked together, the at least one circularly recessed portion 113 is applied to accommodate the plurality of filtration bags 41, thus saving package volume.

3. The plural guiding disks 42 are retained on the water pipe 30 fixedly, so the scraping unit 50 scraps dirt from the membrane surfaces of the plurality of filtration bags 41 clearly.

4. The plural brushers 52 of the scrapping unit 50 intermittently brush the membrane surfaces of the plurality of filtration bags 41, thereby preventing the plurality of filtration bags 41 from damage and prolonging service life of the plurality of filtration bags 41.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fluid filtration device comprising:
a processing tank being a hollowly cuboid tank formed by a plurality of substrate units arranged around the processing tank, and each substrate unit having plural plate members connected together and formed on equal proportion, each plate member having an external surface projecting outwardly and at least one circularly recessed portion defined on an internal surface thereof, and on two connecting edges of any two adjacent plate members being defined a connector, the processing tank further including an inlet, an outlet, and a draining orifice;
a driving unit disposed outside the processing tank;
a water pipe being in connection with the driving unit and inserted into an accommodating chamber of the processing tank via the outlet, the water pipe including a peripheral wall arranged around an axis, a plurality of apertures passing through the peripheral wall, and plural retaining protrusions extending outwardly from the peripheral wall;
a filtering unit including a plurality of filtration bags retained on the water pipe and plural guiding disks retained on the water pipe, any two of the plural guiding disks being retained on two sides of each filtration bag, each filtration bag beings perpendicular to the axis and having a first central pore communicating with the plurality of apertures, each guiding disk having a body, a second central pore corresponding to the first central pore, and a plurality of coupling recesses arranged around a peripheral side of the second central pore and retained with the plural retaining protrusions of the water pipe, such that the plural guiding disks are connected with the water pipe, and the plurality of filtration bags and the plural guiding disks do not rotate relative to the water pipe, and when the driving unit drives the water pipe to rotate, the filtering unit synchronously rotates around the axis of the water pipe; and
a scraping unit, and the scraping unit including a plurality of rotating discs and plural brushers corresponding to the plurality of filtration bags; wherein the plural brushers lightly contact with the plurality of filtration bags so that when the plurality of filtration bags rotate with the water pipe, the plural brushers brush membrane surfaces of the plurality of filtration bags.

2. The fluid filtration device as claimed in claim 1, wherein each plate member of the substrate unit is configured in three specifications containing: a length and a width of each first plate being equal; a length of each second plate being half of a width of each second plate, and an area of each second plate being less than half of that of each first plate; a length and a width of each third plate being equal, and an area of each third plate being half of that of each second plate.

3. The fluid filtration device as claimed in claim 1, wherein the processing tank further includes a manhole arranged on one of the plural plate members on a top end of thereof.

4. The fluid filtration device as claimed in claim 1, wherein the connector has a seal pad, a screw bolt, and a nut.

5. The fluid filtration device as claimed in claim 4, wherein the connector further has an angle bar.

6. The fluid filtration device as claimed in claim 1, wherein the inlet has a first flange, and the outlet has a second flange, the first flange of the inlet and the second flange of the outlet are coupled with two ends of the water pipe.

* * * * *